United States Patent
Van Aert et al.

(10) Patent No.: US 7,022,762 B2
(45) Date of Patent: Apr. 4, 2006

(54) METHOD OF EMULSION POLYMERIZATION

(75) Inventors: Huub Van Aert, Pulderbos (BE); Joan Vermeersch, Deinze (BE); Etienne Van Thillo, Essen (BE); Jos Huybrechts, Moise (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 10/802,706

(22) Filed: Mar. 17, 2004

(65) Prior Publication Data

US 2004/0176527 A1 Sep. 9, 2004

Related U.S. Application Data

(62) Division of application No. 09/995,916, filed on Nov. 28, 2001, now abandoned.

(60) Provisional application No. 60/264,567, filed on Jan. 26, 2001.

(51) Int. Cl.
*C08L 9/04* (2006.01)
(52) U.S. Cl. ..................... 524/828; 524/832; 524/836
(58) Field of Classification Search ............ 524/832, 524/836, 828
See application file for complete search history.

(56) References Cited

U.S. PATENT DOCUMENTS

| | | | |
|---|---|---|---|
| 5,354,800 A * | 10/1994 | Suzuki et al. ............ 524/460 |
| 5,444,118 A * | 8/1995 | Tsuruoka et al. ........ 524/828 |
| 5,525,670 A | 6/1996 | Nishi et al. ............... 524/512 |
| 5,852,124 A | 12/1998 | Wang et al. .............. 525/316 |
| 6,048,924 A | 4/2000 | Obayashi et al. ........ 524/501 |
| 6,174,953 B1 | 1/2001 | Huybrechts ............... 524/504 |

FOREIGN PATENT DOCUMENTS

| WO | 96 15158 | 5/1996 |
| WO | 98 50436 | 11/1998 |

OTHER PUBLICATIONS

European Search Report, Application No. 00 00 0002, Mar. 1, 2001, Cauwenberg.
"Polymer Chemistry", Raymond B. Seymour et al. 2-nd edition, Marcel Decker, Inc., pp. 337-339.

* cited by examiner

*Primary Examiner*—Helen L. Pezzuto
(74) *Attorney, Agent, or Firm*—Joseph T. Guy; Nexsen Pruet, LLC

(57) ABSTRACT

A method has been disclosed of preparing ultrafine hydrophobic latex particles of polymers and copolymers by free radical emulsion polymerization in a water-based system, making use therefor, in order to polymerize or copolymerize monomers or monomer mixtures respectively, of at least one compound selected from the group consisting of dimers and cobalt complexes, acting as a chain transfer agent (CTA), wherein said latex particles have an average particle size of less than 100 nm, being more than 10% lower than if prepared in the absence of said CTA, characterized in that said polymerization is conducted in a water-based reaction in the presence of a chain transfer agent and of a surfactant, wherein said surfactant is present in a concentration versus said monomer or monomer mixture of from 5 up to 25% by weight for a non-ionic surfactant or from 0.05 up to 10% by weight for an ionic surfactant, more particularly a surfactant in a concentration below twice its critical micelle concentration.

6 Claims, No Drawings

METHOD OF EMULSION POLYMERIZATION

This application is a divisional application of U.S. patent application Ser. No. 09/995,916 filed Nov. 28, 2001, abandoned, which claims priority to U.S. Provisional Appl. No. 60/264,567, filed Jan. 26, 2001.

FIELD OF THE INVENTION

The present invention relates to a method of emulsion polymerization making use therefor of a group of selected pure dimers acting as addition fragmentation chain transfer agents and of cobalt complexes as catalytic chain transfer agents (CTA's).

BACKGROUND OF THE INVENTION

Dimers which are often used in order to control the molecular weight in solution polymerizations are e.g. the α-methyl styrene dimer (CAS 6144-04-3 or 6362-80-7) and MMA (methyl methacrylate) dimer (CAS No. 71674-93-6 or 28261-32-7). For control of molecular weight in emulsion polymerizations only the α-methylstyrene dimer has been used by Japan Synthetic Rubber Co (U.S. Pat. No. 5,637,644 and U.S. Pat. No. 5,444,118) until now.

In JP-A 11-292907 e.g. Sekisui was using the α-methylstyrene dimer in a surfactant free emulsion polymerization of styrene which was resulting in the synthesis of a polymer latex having large particle sizes.

Similar to the use of these dimers in emulsion polymerization, macromers can be used. A useful macromer is first prepared by making use of a solution polymerization step. After isolation of this macromer, it is further used in an emulsion polymerization step. This technique has e.g. been applied by Du Pont (in WO 99/42505) and by Rodia Chimie (see WO 99/57167). That polymerization method however implies that two steps are required: a first solution polymerization step and, subsequently, an emulsion polymerization step wherein use is made of the macromer prepared in the first solution polymerization step mentioned hereinbefore.

Control on particle sizes in emulsion polymerization can be done by controlling preparation parameters as amount, type and mode of addition of initiator and surfactant. Addition of traditional chain transfer agents like mercaptans may also have an influence on particle size, but in this case only small changes in particle size are obtained. When making use of lauryl mercaptan it has often been found that the particle size slightly increases because of the presence of more droplet nucleation as the lauryl mercaptan dissolves in the monomer phase and as it allows a higher degree of droplet nucleation, as in mini-emulsion polymerizations, wherein cetylalcohol is used as co-surfactant. In case of the novel chain transfer agents, such as dimers and cobalt complexes, particle size can decrease drastically. A higher number of particles is obtained, presumably due to a higher radical flux. Exit of radicals may occur more frequently, which gives re-entry in another micelle (micelle nucleation) or extra initiation of monomers in the aqueous phase (homogeneous nucleation). In case of the use of dimers, radical addition fragmentation gives a more water soluble radical which can enter in the aqueous phase. The employed dimer can be designed in order to have good copolymerization parameters with the monomers used and in order to obtain radicals with enough water solubility after fragmentation. Also the water solubility of the cobalt complexes can be adjusted.

Introducing dimeric compounds by addition fragmentation transfer is expected to give macromers with unsaturated endgroups. Said macromers might be used for further polymerization, resulting in the synthesis of graft- or block copolymers. Besides the α-methylstyrene dimer and the MMA dimer also functional dimers could be used, resulting in end-functional telechelics. So in U.S. Pat. No. 5,264,530 an improved method of free radical polymerization in an aqueous system, wherein the method employs a macromonomer mixture, having terminal ethylenic unsaturation, as a chain transfer agent under aqueous conditions. Such macromonomers are advantageous for controlling the molecular weight of polymers or copolymers produced therewith but molecular weight reduction has little or no effect on mean particle size as has been established therein. Although the lowest particle size obtained is about 80 nm, a reduction percentage of only 7% versus the comparative example can be reached. The limited effect upon particle size in U.S. Pat. No. 5,264,530 can be explained as follows.

1) The influence of dimers on particle size will be much more pronounced at low surfactant concentrations. If a surfactant concentration is used far above its CMC (critical micelle concentration: micellar nucleation will be more decisive than homogeneous nucleation for the result obtained. Employed dimers will be more effective in reducing the particle size in case that particle nucleation occurs via homogeneous nucleation. In U.S. Pat. No. 5,264,530 a combination of two anionic surfactants is used [Trem LF 40 (allyl dodecyl sulfosuccinate sodium salt) and Dupanol WAOI (sodium lauryl sulfate)]. The initial surfactant concentration is about 4.6 gram/liter TREM LF40+3,9 gram/liter Dupanol WAOI which result in a total amount of 8.5 gram/liter of anionic surfactant. The CMC of Dupanol WAOI is about 2.05 gram/liter. So in case of the emulsion copolymerisation, described in the US-A reference, the surfactant concentration is much higher than the CMC, and so micellar nucleation will influence particle size more pronounced.

2) If a mixture of oligomers is used, larger particle sizes might be obtained due to a lower solubility of the longer oligomers in water. When longer oligomeric radicals are present in a latex particle, re-entry in the aqueous phase is difficult due to the limited water solubility. As a comparison when pure dimeric compounds are used the addition-fragmentation reaction yields a monomer radical, which easily can give a re-entry in the aqueous phase. Furthermore, the presence of longer oligomers gives rise to the formation of block- or graft-copolymers, which may act as in-situ formed surfactants and consequently alter the particle nucleation mechanism.

3) As described by Caterine L. Moad in Macromolecules, 1996, volume 29, page 7717–7726 a pure dimer behaves much more different than the trimer or higher macromonomers, with respect to chain transfer activity, kinetics and mechanism of chain transfer. The rate determining step, i.e. the addition of the double bond and formation of the radical intermediate is mainly controlled by steric effects. In case of an adduct of the dimer the steric repulsion is much less. Differences in kinetics, chain transfer mechanism and steric hinderance of pure dimers in comparison with a mixture of oligomers might influence particle nucleation, and consequently also particle size.

Cobalt complexes are well-know as chain-transfer agent used in order to control polymer molecular weights, but use of cobalt complexes, even in combination with unpurified monomers (containing still some inhibitor), thereby causing a significant particle size decrease, hardly affects molecular weights of polymers thus formed.

Control of molecular weight and particle size now is particularly important in applications, where e.g. sharp-transition melting or latex coalescence is used. Also in applications where transparency and where the specific surface area is important, research to provide control of particle size is crucial. Furthermore smaller particle sizes can facilitate film formation. In some cases this might lead to the situation that less plasticizer is required to give sufficient film formation using dispersions or latices with a high glass transition temperature (Tg) or a high minimal film forming temperature (MFT).

So it is e.g. well-known that is difficult to obtain small particle sizes in emulsion polymerization, without making use of high surfactant or initiator concentrations.

High concentrations of surfactant or initiator can provide undesired polymer mixtures, e.g. when polymer latex particles are used in ink-jet applications or as surface sizing agents. In that case said high concentration of surfactant may lead to bleeding of ink and to an inferior image quality.

OBJECTS OF THE INVENTION

It is an object of the present invention to provide a method for preparing a (co)polymer latex, wherein small (ultrafine) particle sizes are obtained.

It is a further object of the invention to moreover provide a (co)polymer latex, wherein said small (ultrafine) particles show a decreased degree of polydispersity (low polydispersity index).

It is still a further object of the invention to provide a method wherein no solution polymerization is required prior to emulsion polymerization.

Moreover the object of the present invention is to provide useful applications in materials for the polymer latex prepared by the method of the present invention.

SUMMARY OF THE INVENTION

In order to reach the objects of the present invention a method has been described of preparing, by free radical emulsion polymerization in a water-based system, of ultrafine hydrophobic latex polymer and latex copolymer particles optionally having low polydispersity, making use therefor, in order to polymerize or copolymerize monomers or monomer mixtures respectively, of at least one compound selected from the group consisting of dimers and cobalt complexes, acting as a chain transfer agent (CTA), wherein said latex particles have an average particle size of less than 100 nm, being more than 10% lower than if prepared in the absence of said CTA, characterized in that said polymerization is conducted in a water-based reaction in the presence of a chain transfer agent and of a surfactant, wherein said surfactant is present in a concentration versus said versus said monomer or monomer mixture of from 5 up to 25% by weight for a non-ionic surfactant or from 0.05 up to 10% by weight for an ionic surfactant. Particularly preferred is a surfactant concentration below twice its critical micelle concentration.

Further advantages and embodiments of the present invention will become apparent from the following description.

DETAILED DESCRIPTION OF THE INVENTION

The present invention thus offers a method for preparing a polymer latex having ultrafine monodisperse latex particles making use therefor, in an emulsion polymerization step, of (purified) dimeric compounds, also called dimers, wherein the said dimers are selected from the group consisting of α-methyl vinyl compounds or α-ethyl vinyl compounds. Said dimeric compounds acting as chain transfer agents have a chemical structure according to the general formulae (I) or (II)

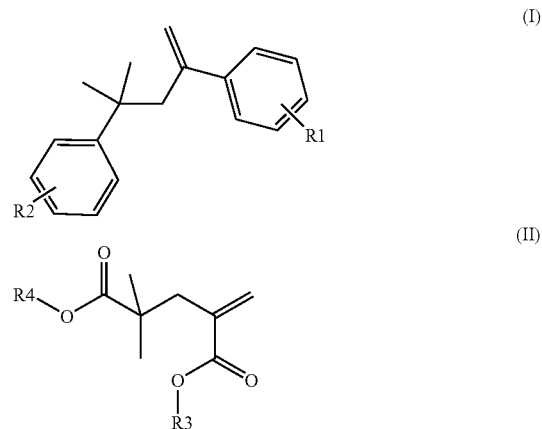

wherein each of R1–R4 independently represents hydrogen, a substituted or unsubstituted alkyl group; or wherein each of R1, R2, R3 and R4 independently represents an oligomeric or a polymeric group.

In one embodiment according to the method of the present invention, said (purified) dimer is selected from the group consisting of dimers or cross-dimers of α-methylstyrene, methyl methacrylate, hydroxy ethylacryla-te, benzyl methacrylate, allyl methacrylate, methacrylonitrile, glycidyl methacrylate, methacrylic acid, tert.-butyl methacrylate, isocyanatoethyl methacrylate, meta-isopropenyl-α, α-dimethyl isocyanate (TMI), ω-sulfoxyalkyl methacrylates and alkali salts thereof.

In a preferred embodiment said (purified) dimeric compound, if present as a hydrophobic, apolar dimer, has a low molecular weight, i.a. a molecular weight of not more than 300, and more preferably a molecular weight of not more than 200 in order to provide a sufficiently high water-solubility in order to perform an emulsion polymerization reaction. Opposite thereto hydrophilic dimers may have higher molecular weights.

In the particular case wherein each of R1 and R2 in general formula (I) represents hydrogen the structure corresponds with the dimer of α-methyl styrene, which is commerially available from Mitsui Chemical (Japan), Herdillia Chemicals (India) en Goi Chemical (Japan). In another particular case wherein each of R3 and R4 in formula (II) represents methyl the structure corresponds with the dimer of methyl methacrylate, which can be prepared by the method described by DuPont, wherein cobalt(II) complexes are used as chain transfer agents as has been described in WO 99/42505.

According to the method of the present invention said cobalt complex(es) is(are) selected from the group consisting of cobalt(II) and cobalt(III)-carbon complexes.

With respect to the said cobalt(II) complexes a preferably used cobalt (II)comples is the diphenyl complex, simply called "cobalt II diphenyl complex" given hereinafter (see formula (III))

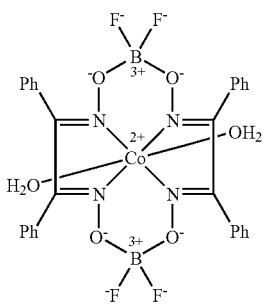

(III)

CASRN 81832-81-7

This complex is also applicable as the same structure without the water molecules present: from the thus applied bis(boron difluorodiphenylglyoximate) cobaltate II complex, the chemical stucture has been given below (see formula(IV))

The CAS-number (number in CHEMICAL ABSTRACTS) has been added thereto.

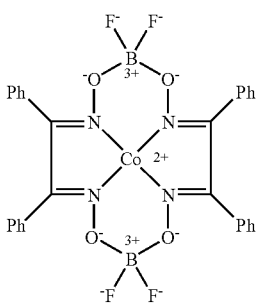

(IV)

CASRN 80290-99-9

Besides the cobalt II diphenyl complex also the dimethyl derivative can be used or other cobalt II complexes. Under CASRN 26220-72-4, said bis(boron difluorodimethyl-glyoximate) cobaltate (II) complex or its di-aqua adduct is known and its structure is given hereinafter as formula (V):

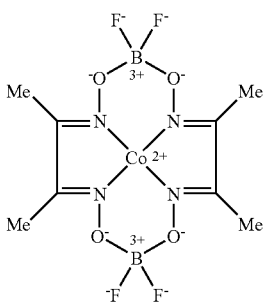

(V)

Besides cobalt II complexes also cobalt III complexes can be used. Suitable cobalt III complexes have e.g. been described by Alexei Alexeyevich Gridnev in PCT-Application WO 9941218(1999) or given by Bunichiro Yamada in J. Polym. Sci., Chem. Ed., volume 32, page 2745–2754 (1994). Examples of such cobalt III complexes are [bis[m-(2,3-butanedione dioximato)(2-)O,O'tetraflorodiborato(2-propyl)N,N',N",N"'](2-propyl)Co(III)]] or benzylbis(dimethylglyximato)(pyridine)cobalt III.

When the cobalt complexes are used as chain transfer agent in order to control the latex particle size in emulsion polymerizations, as described in the preferred embodiments of the current invention, usually the molecular weight of the formed polymer decreases drastically. Surprisingly, when the monomers were used without further purification, the molecular weight decrease was much less. Due to the presence of the inhibitor MEHQ (hydroquinone monomethyl ether) the molecular weight remains high, which is important, in particular in order to obtain the required mechanical strength. In case of the scratch resistant backing layer of a graphic film, as described in one of the embodiments of the present invention, a high molecular weight PMMA is preferred in order to obtain the desired mechanical properties. Therefore in most experiments MMA was not destilled. When cobalt complexes are then used in emulsion polymerization, no significant molecular weight decrease occurs. Its influence on particle size however remains the same.

Irrespective of the preparation method of the dimeric compounds, whether performed by making use of clay or ion exchange resins, catalysis by cobalt(II) complexes or other synthetic procedures, it is a stringent demand in the present invention to start from (purified) dimeric compounds, in order to reach the benifits as described hereinbefore.

In another embodiment according to the method of the present invention, said (purified) dimer is selected from the group consisting of α-methylstyrene-dimer, a methyl methacrylate dimeric compound.

More particularly said (purified) dimeric compounds used in the method of the present invention have a chemical structure selected from the group consisting of (numbers in CHEMICAL ABSTRACTS -CAS-added between brackets):
4-methyl-2,4-diphenyl-1-pentene (CASRN 6144-04-3 or 6362-80-7)
2,2-dimethyl-4-methylene-pentanedioic acid, dimethyl ester (CASRN 71674-93-6 or 28261-32-7)
2,2-dimethyl-4-methylene pentanedioic acid dibutyl ester (CASRN 100639-40-5)
2,2-dimethyl-4-methylene entanedioic acid bis(2-isocyanatoethyl) ester(CASRN 100639-43-8)
2,2-dimethyl-4-methylene pentanedioic acid dicyclohexyl ester (CASRN 100639-44-9)
2,2-dimethyl-4-methylene pentanefioic acid bis(2-hydroxypropyl) ester(CASRN 100639-45-0)
2,2-dimethyl-4-methylene pentanefioic acid bis(oxiranylmethyl) ester(CASRN 199542-57-9)
2,2-dimethyl-4-methylene-glutaric acid (CASRN 10297-25-3)
2,2-dimethyl-4-methylene pentanedioic acid bis(2-hydroxyethyl) ester (CASRN 100639-42-9)
2,4-bis-(4-(hexadecyloxy)-phenyl)-4-methyl-1-pentene (CASRN 3902-46-3)
1,1'-[(,1,-dimethyl-3-methylene-1,3propanediyl)di-3,1-phenylene] bis-ethanone (or 2,4-bis(4-acetoxyphenyl)-4-methyl-1-pentene) (CASRN160185-22-8)
In the general formulae (I) and (II) each of R1-R4, besides the already mentioned hydrogen and alkyl substituents in the dimer formulae, independently represents hydroxyl, carboxylic acid, amino, sulphonate, phosphonate and salts thereof; isocyanato or oligomeric groups.

Similar compounds which have not been prepared by dimerization of a α-methyl containing monomer, e.g. with two methyl groups next to the CH$_2$-group in the formulae (I) and (II), may be replaced by other substituents.

Besides the dimers of methacrylates or alpha-methylstyrene derivatives also cross-dimers can be used as described in the following references:

Yamada, Bunichiro; Konosu, Osamu. *Kobunshi Ronbunshu* (1997), 54(10), 723–730;

Kobatake, Seiya; Yamada, Bunichiro. *J. Polym. Sci., Part A: Polym. Chem.* (1996), 34(1), 95–108;

Yamada, Bunichiro; Tagashira, Shinji; Aoki, Shuzo. *J. Polym. Sci., Part A: Polym. Chem.* (1994), 32(14), 2745–2754;

Yamada, Bunichiro; Kobatake, Seiya; Aoki, Shuzo. *Macromol. Chem. Phys.* (1994), 195(2), 581–90

Akutsu, Fumihiko; Aoyagi, Kaoru; Nishimura, Nozomu; Kudoh, Masaaki; Kasashima, Yoshio; Inoki, Mari; Naruchi, Kiyoshi. *J. Chem. Soc., Perkin Trans.* 2 (1996), (5), 889–892;

Kudoh, Masaaki; Akutsu, Fumihiko; Odagawa, Yoshiyuki; Naruchi, Kiyoshi; Miura, Masatoshi. *Macromol. Chem. Phys.* (1994), 195(1), 385–90.

Examples of such cross-dimers are:

CASRN 139623-17-9: pentanedioic acid, 2-ethyl-4-methylene-, dimethyl ester: cross-coupled dimer obtained by thermal reaction of sodium crotonate/methacrylate in solid state followed by esterification with diazomethane.

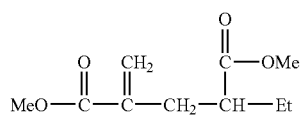
(VI)

CASRN 100371-68-4: 2,2-dimethyl-4-phenyl-4-pentenenitrile

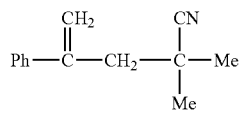
(VII)

CASRN 128454-73-9: methyl 4-methyl-2-methylene-4-phenylpentanoate: dimer of α-methylstyrene and methylmethacrylate

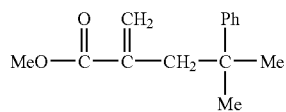
(VIII)

CASRN 158987-25-8: methyl 2,2-dimethyl-4-phenyl-4-pentenoate: dimer of methyl methacrylate and α-methylstyrene

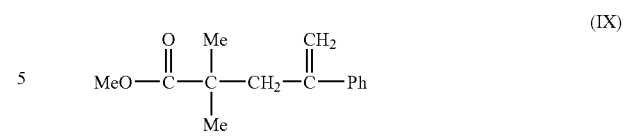
(IX)

CASRN 158987-26-9: ethyl 4-methyl-2-methylene-4-phenylpentanoate

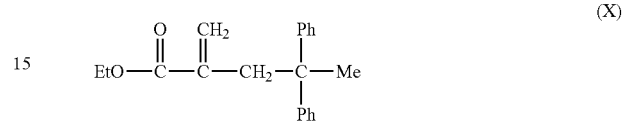
(X)

CASRN 158987-27-0: ethyl 2,2-dimethyl-4-phenyl-4-pentenoate

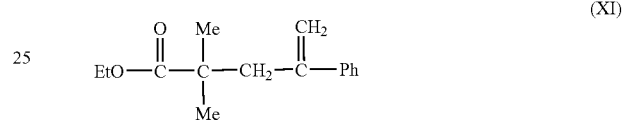
(XI)

CASRN 158987-28-1: 4-methyl-2-methylene-4-phenylpentanenitrile

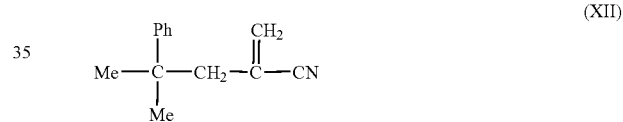
(XII)

CASRN 158987-29-2: 2,2-Dimethyl-4-methylenepentanedinitrile

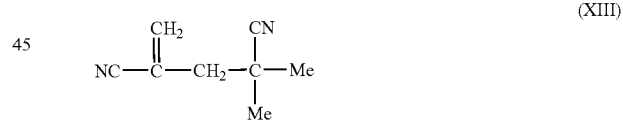
(XIII)

Otherwise making use of functional dimers α,ω-functional polymers can be prepared by emulsion polymerization. Besides the formation of ultra-fine latex particles, the resulting polymer chains have a functional end-group. When the dimer of e.g. hydroxyethylmethacrylate (HEMA) is used as chain transfer agent a bis-hydroxy terminated polymer is obtained. This phenomenon has already been described by Haddleton (*Polymer* (1998), 39(14), 3119–3128) in a solution polymerization reaction. Hydroxyethyl methacrylate dimer macromonomer prepared from catalytic chain transfer polymerization and isolated as a pure compound is an efficient chain transfer agent. The mode of chain transfer proceeds via β-scission, thus resulting in breaking the bond in the dimeric molecule in order to get two identical parts when adding to a propagating poly(methyl methacrylate) radical, terminating the polymerization and providing a hydroxyethyl methacrylate radical which reinitiates polymerization. A combination of these two reaction phenomena leads to di-hydroxy telechelic products, demonstrated to have a functionality of 2.05 by a combination of NMR and size exclusion chromatographt. The dimer used has the structure as given below:

CASRN 100639-42-7: HEMA dimer: 2,2-dimethyl-4-methylene-pentanedioic acid, bis(2-hydroxyethyl) ester

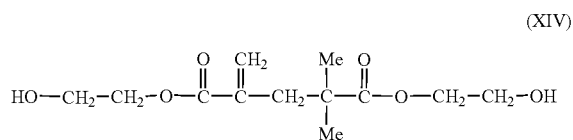

(XIV)

In order to obtain α,ω-functional polymers, methacrylate dimers are very suitable agents while they being quite easily prepared by making use of the cobalt complexes.

Another example makes use of the benzyl methacrylate dimer macromonomer as a radical addition fragmentation chain transfer agent in a polymerization of MMA. This results in poly(methyl methacrylate) with both α- and ω-terminal benzyl methacrylate units. Catalytic hydrogenation of α,ω-benzyl methacrylate terminal poly(methyl methacrylate) results in evolution of toluene and formation of α,ω-dicarboxyl functional telechelic poly(methyl methacrylate).

A preferred dimer used in our experiments has been given hereinafter:

CASRN 208192-24-9: 2,2-dimethyl-4-methylene-, pentanedioic acid bis(phenylmethyl) ester

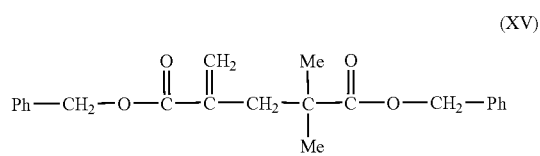

(XV)

In the experiments hereinafter an investigation reaction of such funtional dimers in an emulsion (co)polymerization reaction has been performed. The prepared end-functional polymers can be used as building blocks for blockcopolymers and networks: e.g. the hydroxy-terminated polymers prepared from the HEMA-dimer can be used in order to prepare polyester- or polyurethane-blockcopolymers. Cross-linked networks can be formed e.g. by casting films of the latices with α,ω-dicarboxylic functional polymer latices in combination with water-based epoxy resins, as e.g. those available from SHELL (The Netherlands) or CIBA-GEIGY (Switzerland). The polymers prepared from the dimer of allyl-methacrylate, thus having allylic end-groups can be used in reaction with hydride-functional polysiloxanes in a hydrosilation reaction. This type of reaction gives opportunities to prepare numerous novel siloxane block- and graft-copolymers.

Mixed dimers can lead to functional telechelics with reactive end-groups having complementary reactivity. One also could mix latices with different functional groups, e.g. hydroxy end-terminated polymer latices with isocyanato functional latices.

Upon casting of such latices cross-linking occurs after film formation. The use of reactive polymer latex blends is described by John Geurts in his PhD thesis (Technical University of Eindhoven) or in Van Es,S. et al. *NATO ASI Ser., Ser. E,* (1999), volume 335, page 451–462.

It is clear that the functional polymers prepared in an emulsion polymerization reaction are particularly useful for further interesting reactions in water-based systems. The dried polymer can be isolated by freeze-drying or vacuum-drying and can be used in further reactions performed in organic solvents or in melt reactions.

Different types of oligomeric macromonomers are suitable for use as chain transfer agents in emulsion polymerization reactions, such as e.g. those containing oligo(hydroxyethyl methacrylate) macromers as mentioned in DuPont's WO 99/42505, clearly give rise to a lower particle size, if compared e.g. with the water-insoluble macromonomers with 2-ethyl-hexyl-methacrylate mentioned in WO 99/57167 (Rhodia Chemie). So according to the method of the present invention water-soluble (purified) oligomers are preferred, as e.g. the water-soluble macromonomers having surface-active graft copolymers with a hydrophilic graft and a hydrophobic main chain, generated by in-situ polymerization as disclosed by DuPont. Although besides dimers also trimers, and even tetramers might be useful in order to reach the objects of the present invention, it can be expected that dimers are superior with respect thereto, due to a better solubility in water and to the fact that pure dimers (A-A) lead to well-defined polymeric compounds, opposite to the less-defined polymeric compounds generated after reactions when use has been made from timers (A-A-A) or tetramers as becomes clear from a simple representation of the reaction scheme made hereinafter:

| A-A+nB→A(B)$_n$A | (XVI) |
| A-A-A+nB→AA(B)$_n$A | (XVII) |
| A-A-A+nB→AAA(B)$_n$A | (XVIII) |
| A-A-A+nB→AAAA(B)$_n$A | (XIX) |

The well-defined character of the prepared polymers is particularly important for the functional dimers.

A survey of such chain transfer agents and a comparison of their activities in bulk polymerizations of methyl methacrylate has e.g. been reviewed in *Macromolecules,* 29, 7717 (1996).

In another embodiment of the method according to the present invention said (purified) dimer is thus a water-soluble oligomer having surface-active graft copolymers with a hydrophilic graft and a hydrophobic main chain. An example of a preferred structure of an oligomeric dimer, e.g dimer of methacryl oxy (polyethylene oxide) has been given hereinafter in the formula (XX)

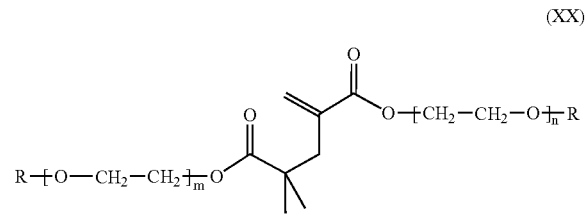

(XX)

In this formula (XX) R represents a member selected from the group consisting of hydrogen, alkyl, sulphonic acid, carboxylic acid and phosphonic acid or salts thereof.

The (preferably water-soluble) dimeric compound having a low molecular weight can thus, apart from being dissolved in its monomer, be dissolved in an aqueous phase. Emulsion polymerization may further be performed semi-continuous or batch-wise, but essentially the reaction proceeds in a one step water-based procedure, implying no solution polymerization in advance.

It has clearly been pointed out that making use of the method of the present invention by addition of dimeric compounds according to the general formulae (I) or (II), makes particle size to decrease with a factor of more than 10% on the average, if compared with a method wherein dimeric compounds are absent during emulsion polymerization. In a preferred embodiment said latex particles have an average particle size being at least 20% lower than if prepared in the absence of said chain transfer agents (CTA's).

More particularly use of modified dimers, e.g. hydroxyethylmethacrylate dimers as e.g. hydroxyethyl methacrylate dimer, results in bis-hydroxyl terminated polymers. As by these polymerization reactions end-group functional polymers become available this opens new perspectives in order to fully reach the advantages, mentioned in the objects of the present invention, more particularly with respect to the preparation of latex polymer particles having smaller particle sizes, without the need to apply a solution polymerization step prior to the said emulsion polymerization.

A preferred embodiment of the present invention consists in the presence in the polymerization reaction step of a low concentration of surfactant versus the functional dimer in order to provide well-defined $\alpha,\omega$-terminated telechelics. So according to the method of the present invention presence of low ionic, and even more preferred anionic surfactant or initiator concentrations of from 0.05 wt % up to 10 wt % versus monomer or monomer mixture concentrations is preferred, more preferably from 0.05 up to 5% by weight versus said monomer or monomer mixture concentrations and even most preferably in an amount of from 0.05 up to 1 wt %. As already set forth hereinbefore said surfactant is present in a much higher concentration, i.a. of from 5 up to 25% by weight for a non-ionic latex. According to the present invention the surfactant itself is present in a concentration below twice its critical micelle concentration.

Monomers which may be used in the emulsion (co) polymerization reactions according to the method of the present invention are selected form the group of styrenes derivatives, methacrylates, acrylates, methacrylamides, acrylamides, maleimides, vinyl ethers, vinyl esters. More specifically the monomers used in the emulsion polymerisation consist of the group of styrene, para-methylstyrene, tert.-butylstyrene, methylmethacrylate, ethylmethacrylate, butylmethacrylate, glycidylmethacrylate, hydroxyethylmethacrylate, $\alpha$-methylstyrene, ethylacrylate, butylacrylate, vinylacetate, vinyl versatate, butadiene, isoprene, acrylonitrile, methacrylonitrile, sulfoethyl methacrylate and its alkali salts, acrylic acid, methacrylic acid, tert-butyl acrylamide, AMPS, N-isopropylacryl-amide, itaconic acid, maleic acid, maleic anhydride, vinylidene chloride, isopropylmethacrylate, dialkyl itaconate, acrylonitrile, methacrylonitrile and vinyl chloride.

According to the method of the present invention useful surfactants are compounds selected from the group consisting of anionic surfactants, non-ionic surfactants or cationic surfactants, or mixtures thereof. Particular examples of anionic surfactants are fatty alcohol sulphates, alkylphenol sulphates, fatty alcohol ether sulphates, fatty alcohol ether sulphates, alkylphenol ether sulphates, alkylbenzene sulphonic acid, alkyl ether carboxylic acid and salts thereof, alkyl sulphosuccinates, alkyl sulphosuccinamates, phosphate esters, $\alpha$-olefin sulphonates, etc. Particular examples of non-ionic surfactants are alcohol ethoxylates, alkylphenol ethoxylates, polyethylene oxide/polyethylene oxide block copolymers, polyvinyl alcohol, polyvinyl pyrrolidone, sorbitan fatty acid esters, sorbitan ester ethoxylates, etc. Particular examples of cationic surfactants are alkyl dimethylamines, quaternary ammonium compounds, etc. In some cases the presence of ionic groups at the surface of, or buried in the polymer latex particle should be avoided by using low concentrations of anionic surfactant and low persulphate initiator concentrations in order to obtain pure hydrophobic latex particles.

According to the present invention said ultrafine hydrophobic latex particles of polymers and, prepared according to the method as disclosed herein, are suitable for use in printing plates for computer-to-plate or computer-to-press applications, including lithography and flexography, in silver halide based graphic, cinematographic and micrographic film materials, in medical diagnostic or recording photographic film materials, in photoresist applications and in ink-jet media. Use of said hydrophobic (co)polymer latex particles in coated layers as e.g. in materials for ink-jet applications moreover leads to the desired advantage of lower load of the layers with said surfactants and to reduction of disadvantageous "bleeding" effects, resulting therefrom. The fine polymer particles can be used as organic pigments in ink-jet media, instead of the usually employed inorganic pigments, such as silica and aluminum oxide. Using such ultrafine latices the desired gloss can be obtained with good drying characteristics. Otherwise a sharp polarity switch occurs between hydrophobic and hydrophilic states in applications where it is desired, as e.g. in printing plates, computer-to-plate and computer-to-press applications. In graphic or medical silver halide film materials transparancy is very important. In order to obtain an hard scratch resistant films, such as in backing layers, polymers with a high glass transition temperature are used. In order to obtain sufficient film formation NMP (N-methylpyrrolidone) was added. In order to improve film formation with addition of less NMP, the ultrafine latex polymers prepared according to the method of the present invention are useful. As an additional advantage use of lower amounts of NMP is environmentally more attractive and acceptable.

According to the present invention ultrafine hydrophobic latex particles of polymers and copolymers prepared according to the method as described hereinbefore, are used in printing plates for computer-to-plate or computer-to-press applications or are used in silver halide based graphic, medical, cinematographic and micrographic film materials, in photoresist applications and in ink-jet media, without however being limited thereto. Illustrations thereof can be found hereinafter in the examples.

Application of the method of the present invention clearly illustrates that the (purified) chain transfer agent used in the water-based emulsion polymerization reaction without a prior solution polymeriza-tion reaction step is not only influencing molecular weight of the polymer, but also has a remarkable influence on the size of the latex particles thus obtained in that, according to the method of the present invention particle sizes of less than 100 nm, more preferably in the range from 10 to 90 nm and even more preferably in the range from 20 to 70 nm are easily available, wherein a reduction in particle size of at least 10%, and more preferably of more than 20% less than if prepared in the absence of said CTA has been attained. Particle sizes were always measured with a Brookhaven BI90 particle sizer.

Making use of the method of the present invention thus clearly makes decrease particle size of polymer latex particles and polydispersity thereof as becomes clear from the reactions wherein dimers (dimeric compounds) in emulsion polymerization have been used. This will be illustrated, without being exhaustive, in the Examples hereinafter.

EXAMPLES

While the present invention will hereinafter be described in connection with preferred embodiments thereof, it will be understood that it is not intended to limit the invention to those embodiments. The molecular weights as mentioned in the examples are measured by means of Size Exclusion Chromatography using THF as solvent. Prior to this analysis the samples are freeze dried. The solids content are obtained by drying in a oven during 12 hours at 105° C. Particle size of the latices are measured by means of light scattering using a Brookhaven BI90 particle sizer.

vacuum destination for 1 hour at 80° C. The latex was cooled to room temperature, filtered over a coarse filtration paper and a biocide was added.

Employed Dimers

Whereas the MMA-dimer was not commercially available, the α-methylstyrene dimer was available from many differing companies, like Mitsui Chemicals (Japan), GOI Chemical (Japan) and Herdillia Chemicals (India). AMSD-GRH (V61706), from GOI Chemical Co., having a purity of 97.18%, was used. The MMA dimer was prepared by means of a cobalt (II) complex supplied by DuPont. The MMA dimer was prepared by means of a cobalt (II) complex, i.e. a (bis(boron difluorodimethyl-glyoximate) cobaltate (II) complex).

3. MMA Emulsion Polymerization Making use of MMA Dimer(Table 1)

TABLE 1

| Reaction No. | Reaction Parameters | Conc % | φ (nm) | Mn | Mw | MWD | Melt visco Pas 200° C. |
|---|---|---|---|---|---|---|---|
| 1 (comp.) | No CTA, 0.5% $K_2S_2O_8$, 2% Empicol ESB, 85° C. | 20.53 | 64 | 104846 | 320120 | 3.053 | |
| 2 (inv.) | 2% MMA Dimer 0.5% $K_2S_2O_8$, 2% Empicol ESB, 85° C. | 20.4 | 49 | 12757 | 31997 | 2.508 | 1823 |

1. Semi-continuous Emulsion Polymerization of MMA (Methyl Methacrylate) Making Use of the MMA Dimer as Chain Transfer Agent (MMA=Methyl Methacrylate).

20.0 g of a 10 wt % aqueous solution of an anionic surfactant as Empicol ESB 70 (lauryl ethoxy (2EO) sulfate) and 353 g of water were added into a 1 l jacketed reactor with nitrogen flow and stirred at 250 rpm. Subsequently the reactor was heated to 85° C. 20 gram of MMA and 0.40 g of the MMA-dimer were added into the reactor. The emulsion was stirred for 5 minutes. Subsequently the reaction was initiated by addition of 25 g of a 2 wt % aqueous solution of $K_2S_2O_8$ into the reactor. 80.0 g of MMA combined with 1.60 g of MMA-dimer were pumped into the reactor within a time interval of 30 minutes.

When all ingredients were added the reaction was allowed to continue for two additional hours, after which the residual monomer was stripped by vacuum destillation. The reactor was cooled to room temperature and subsequently the latex was filtered over coarse filtration paper.

2. Semi-continuous Emulsion Polymerization of Styrene Using α-methylstyrene Dimer as Chain Transfer Agent 54.0 gram of a 10 wt % aqueous solution of Empicol ESB 70 (lauryl ethoxy (2EO) sulfate) and 1258.8 g of water were added into a 2 l jacketed reactor with nitrogen flow and stirred at 250 rpm. The reactor content was heated up to 80° C. Subsequently 30 gram of a 2 wt % aqueous $K_2S_2O_8$ solution were added. After 10 minutes the monomer phase and initiator solution are added simultaneously during 2 hours. The monomer phase contained 360 grams of stryrene and 7.2 grams of α-methylstyrene dimer. The initator solution was containing 60 grams of a 2 wt % aqueous $K_2S_2O_8$ solution. The reactor contents was post heated during 1 hour at 80° C. Residual monomer was removed afterwards by Making use of low amounts of surfactants (0.5 wt % only) and pure MMA dimer thus leads to a reduction of the weight average molecular weight (Mw) and the number average molecular (Mn). The molecular weight distribution (MWD) or polydispersity index (D) is calculated by dividing the Mw by the Mn. Besides the lower molecular weights and lower MWD, the average particle size of the polymer latex particles is reduced with at least 25% if compared with the comparative method, performed without making use of said MMA Dimer as CTA.

4. Styrene Emulsion Polymerization with α-Methylstyrene-dimer (See Following Table 2)

Dimers were used herein as addition-fragmentation CTA in styrene emulsion polymerizations. Since the cobalt II diphenyl complex is not active for styrene polymerizations. Some reactions were performed using either the α-methylstyrene dimer or MMA dimer as addition-fragmentation CTA.

Opposite to the MMA-dimer the α-methylstyrene dimer is commercially available from companies, like Mitsui Chemicals (Japan), GOI Chemical (Japan) and Herdillia Chemicals (India). In these experiments AMSD-GRH, from GOI Chemical Co., with a purity of 97.18%, was used. The MMA dimer was prepared by means of a cobalt (II) complex, called "cobalt II diphenyl complex", given hereinbefore as formula (III).

The MMA dimer was synthesized in the following way. Destilled methylmethacrylate (500 ml) dissolved in acetone (500 ml) was put into a two liter three necked round bottom flask, and fittes with a gas inlet and reflux condensor. After purging with argon for two hours at 72° C. the bis(boron difluorodimethyl-glyoximate) cobaltate (II) complex (170 mg) and AIBN (500 mg) were added. Conversions were kept low in order to avoid higher molecular weight oligomers to be formed. This was achieved by taking two hours as the reaction time, after which the unreacted MMA was removed by a rotary evaporator. Pure MMA dimer (150 gram) was obtained by destillation under reduced pressure (53° C., $4 \times 10^{-3}$ bar).

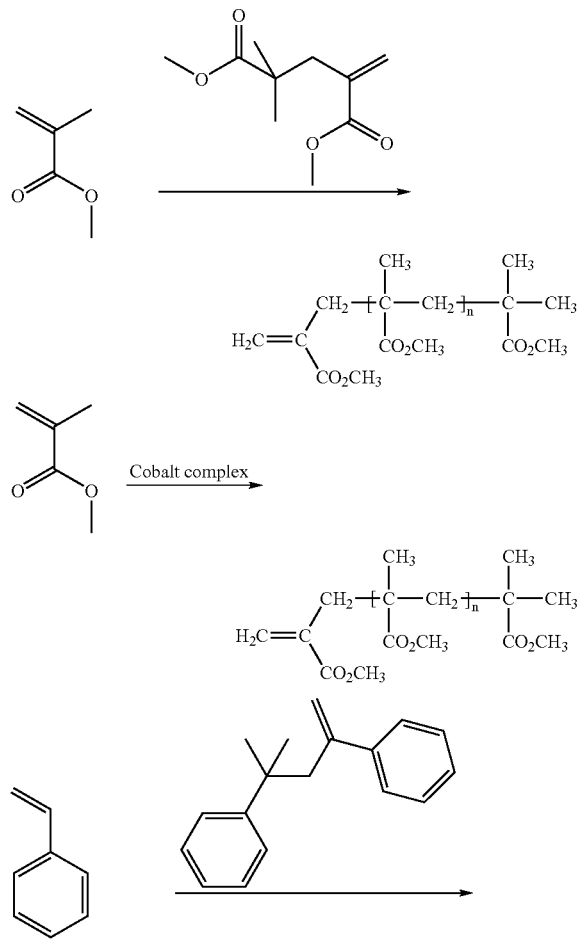

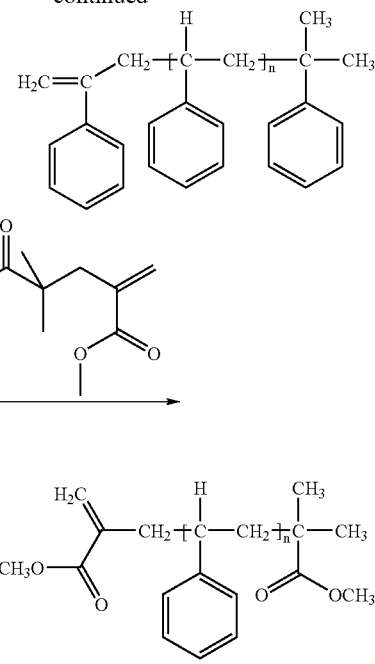

As can be concluded from the results in Table 2 hereinafter, besides molecular weight reduction and decreased polydispersity, presence of 2% of α-Methylstyrene dimer leads to a remarkable reduction of about 30% in particle size!

It is further clear that the results obtained with MMA dimer are less convincing with styrene: besides a particle size reduction of not more than 10%, the molecular weight decrease is less significant! Therefore one should be aware of selecting the best dimer which has good copolymerization parameters (reactivity ratios) with the reading monomers. E.g. the MMA dimer will work sufficient in copolymerization with acrylates and methacrylates, whereas the alpha-methyl styrene dimer is suitable for use in styrene copolymerization.

TABLE 2

| Exp. No. | Reaction parameters | Conc. % | φ (nm) | Mn | Mw | MWD | Melt visco Pas 200° C. |
|---|---|---|---|---|---|---|---|
| 3 (comp.) | No CTA, 0.5% $K_2S_2O_8$, 1.5% Empicol ESB, 80° C. | 20.4 | 78 | 119563 | 312764 | 2.616 | |
| 4 (inv.) | 0.5% α-Methylstyrene dimer, 0.5% $K_2S_2O_8$, 1.5% Empicol ESB, 80° C. | 20.36 | 58 | 22522 | 70206 | 3.117 | |
| 5 (inv.) | 2% α-Methylstyrene dimer, 0.5% $K_2S_2O_8$, 1.5% Empicol ESB, 80° C. | 20.11 | 54 | 9706 | 28870 | 2.974 | 84.2 |
| 6 | 2% MMA dimer, 0.5% $K_2S_2O_8$, 1.5% Empicol ESB, 80° C. | 20.65 | 70 | 40000 | 121318 | 3.033 | 3075 |

5. Example of a Methyl Methacrylate (MMA) Emulsion Polymerization Using the Cobalt II Diphenyl Complex (Formula (III) Hereinbefore) as Chain Transfer Agent, Making Use of a Persulfate Initator.

36.0 grams of a 10% aqueous solution of Empicol ESB 70 and 1303 g water were added to a 2 l jacketed reactor with nitrogen flow, stirred at a rate of 250 rpm. The cobalt complex, set forth hereinbefore as formula (III) (0.02 gram=60 ppm) was dissolved separately in the methyl methacrylate (MMA) monomer (360 gram). The monomer-cobalt complex mixture was kept under nitrogen. Subsequently 20% of the MMA containing 20% of the cobalt complex was added to the reactor. Then the reactor was heated to 85° C. and is flushed with nitrogen. 100.8 grams of a 2% aqueous solution of $Na_2S_2O_8$ was prepared (corresponding with 0.56% towards monomer amount). 25% of the initiator solution was added to the heated reactor. After 18 minutes initial latex particles were formed. Then 50% of the initiator solution and 80% of the monomer/cobalt II diphenyl complex mixuture was pumped simultaneously in the reactor during 30 minutes. When all ingredients were added, the reaction was allowed to continue for an additional 15 minutes.

A post initiation was performed consequently, making use of 25% of the initator solution. After 40 minutes the residual monomer was stripped by vacuum destillation. The resulting polymer latex had a particle size of 62 nm, measured by making use of a Brookhaven BI 90 particle sizer.

6. Example of a MMA Emulsion Polymerization Using the Cobalt II Diphenyl Complex (Formula (III) Hereinbefore) as Chain Transfer Agent and Making Use of an Azo Initiator.

360 g of MMA and 0.02 gram (=60 ppm) of cobalt II diphenyl complex were combined in a flask and stirred magnetically. 72.0 g of an aqueous solution (10 wt %) of the surfactant Empical ESB 70 were added to a 2 liter jacketed reactor and combined with 1278 g of water. The reactor was pursed with nitrogen. Then 20% of the monomer/cobalt complex mixture were added to the reactor. The reactor was heated to 85° C. After 5 minutes the initiator (4,4'-azobis (4-cyanopentanoic acid) potassium salt) was added (90 g of a 2% aqueous solution=0.5% towards monomer amount). During 30 minutes 80% left of the monomer/cobalt mixture were added during 30 minutes. When all monomer was added the reaction was continued for 2 hours at 85° C. Residual monomer was removed by vacuum destillation. The resulting polymer latex had a particle size of 52 nm, as measured by means of a Brookhaven BI 90 particle sizer. Other similar emulsion polymerizations of MMA have been summarized in the Table 3 below. The same conclusions with respect to the advantageous use of CTA's can be drawn as in the previous examples. Further in Table 4 hereinafter, following the experiments according to the point 7 were set out, wherein styrene copolymer latex particles have been prepared with α-methyl styrene dimer as CTA (and compared with laurylmercaptan—LSH).

TABLE 3

| MMA Polymerization No. | Reaction parameters | φ (nm) | Mn | Mw | MWD |
|---|---|---|---|---|---|
| 7 (comp.) | No CTA, 0.56% $Na_2S_2O_8$, 1% Empicol ESB, 85° C., 2l employed MMA > 99.9% pure + 10–25 ppm inhibitor MEHQ | 78 | 167953 | 569367 | 3.39 |
| 8 (inv.) | 60 ppm Cobalt II diphenyl, 0.56% $Na_2S_2O_8$, 1% Empicol ESB, 85° C., 2l employed MMA > 99.9% pure + 10–25 ppm inhibitor MEHQ | 63 | 154947 | 350494 | 2.26 |
| 9 (comp.) | 0.5% AIBN(COOK)$_2$, No CTA 2% Empicol ESB, 85° C., 2l Destilled MMA | 71 | 205167 | 603924 | 2.94 |
| 10 (inv.) | 30 ppm Cobalt II diphenyl, 0.5% AIBN(COOK)$_2$, 2% Empicol ESB, 85° C., 2l Destilled MMA | 54 | 25703 | 48090 | 1.87 |
| 11 (inv.) | 60 ppm Cobalt II diphenyl, 0.5% AIBN(COOK)$_2$, 2% Empicol ESB, 85° C., 2l Destilled MMA used | 52 | 5782 | 10028 | 1.73 |
| 12 (inv.) | 60 ppm Cobalt II diphenyl, 0.5% AIBN(COONa)$_2$, 2% Empicol ESB, 85° C., 2l employed MMA 99% + 100 ppm inhibitor MEHQ | 51 | 48945 | 84549 | 1.73 |
| 13 (inv.) | 60 ppm Cobalt II diphenyl, 1.25% AIBN(COONa)$_2$, 2% Empicol ESB, 85° C., 2l employed MMA 99% + 100 ppm inhibitor MEHQ | 46 | 64773 | 103871 | 1.82 |
| 14 Comp. | No CTA, 0.50% AIBN(COONa)$_2$, 6% Empicol ESB, 85° C., 2l employed MMA 99% + 10–25 ppm inhibitor MEHQ | 47 | 127794 | 478574 | 3.75 |

TABLE 3-continued

| MMA Polymerization No. | Reaction parameters | φ (nm) | Mn | Mw | MWD |
|---|---|---|---|---|---|
| 15 Inv. | 60 ppm Cobalt II diphenyl, 0.50% AIBN(COONa)₂, 6% Empicol ESB, 85° C., 21 employed MMA 99% + 10–25 ppm inhibitor MEHQ | 26 | 133767 | 502936 | 3.76 |
| 16 | 60 ppm Cobalt II diphenyl, 0.50% AIBN(COONa)₂, 2% Empicol ESB, 85° C., 21 employed MMA 99% + 10–25 ppm inhibitor MEHQ, all MMA + initiator added semi-continuously | 36 | 116659 | 306216 | 2.62 |

7. Styrene Copolymer Latex Particles Prepared with α-methyl Styrene Dimer as CTA (and Comparison with Laurylmercaptan—LSH).

LSH=laurylmercaptan; AMSD=α-methylstyreen dimer; NIPA=N-isopropyl acrylamide

TABLE 4

| Exp. No. | Monomers Weight ratio | Chain Transfer Agent (wt %) | φ (nm) | Mn g/mol | Mw g/mol | D |
|---|---|---|---|---|---|---|
| 17 comp. | Styrene/NIPA 85/15 | LSH 0.025% | 67 | 56316 | 193518 | 3.4 |
| 18 inv. | Styrene/NIPA 85/15 | AMSD 1.0% | 57 | 32769 | 101140 | 3.09 |
| 19 comp. | Styrene/Acrylonitrile 66.3/33.7 | No CTA | 55 | 71907 | 191538 | 2.66 |
| 20 inv. | Styrene/Acrylonitrile 66.3/33.7 | AMSD 0.5% | 47 | 81889 | 478978 | 5.80 |
| 21 comp. | Styrene/Methacrylonitrile 60.8/39.2 | No CTA | 62 | 79369 | 208977 | 2.63 |
| 22 comp. | Styrene/Methacrylonitrile 60.8/39.2 | AMSD 0.5% | 55 | 42052 | 98703 | 2.35 |
| 23 inv. | Styrene/Methacrylonitrile 60.8/39.2 | AMSD 1.0% | 55 | 31237 | 68286 | 2.19 |
| 24 inv. | Styrene/Methacrylonitrile 60.8/39.2 | AMSD 2.0% | 50 | 19582 | 43487 | 2.22 |

8. Other Latices Prepared Using AMSD (See Illustration in Table 5).

TABLE 5

| Exp. No. | Monomers Weight ratio | CTA (wt %) | φ (nm) | Mn g/mol | Mw g/mol | D |
|---|---|---|---|---|---|---|
| 25 Comp. | t-butylstyrene/acrylonitrile 75.15/24.85 | No CTA | 47 | 159250 | 988401 | 6.2* |
| 26 Inv. | t-butylstyrene/acrylonitrile 75.15/24.85 | AMSD 0.5% | 41 | 155958 | 972945 | 6.2* |

*= bimodal distribution

It can easily be deduced from the Tables 4 and 5 that AMSD (=α-methylstyrene dimer) acts in a superior way with respect to LSH (=laurylmercaptan) in order to provide latex polymer particles having extremely fine sizes (at least 10% smaller than prepared without CTA) and a low polydispersity, according to the objects of the present invention.

9. Examples with Respect to Use in CtP Thermal Printing Plate a. Use of Polystyrene Homopolymer Latices (See Table 6)

TABLE 6

| Latex no. | CTA | Sensitivity mJ/cm² |
|---|---|---|
| 3 (comp.) | 0.015% LSH | 245 |
| 6 (inv.) | 2.0% MMA-dimer | 225 |
| 4 (inv.) | 0.5% AMSD | 200 |
| 5 (inv.) | 2.0% AMSD | 185 |

LSH: laurylmercaptan,
AMSD: alpha-methylstyrene dimer b. Use of Styrene Copolymer Latices (See Table 7)

TABLE 7

| Latex No. | Monomers Used | CTA | Sensitivity mJ/cm² |
|---|---|---|---|
| 17 (comp.) | Styrene/NIPA | 0.015% LSH | 310 |
| 18 (inv.) | Styrene/NIPA | 1.0% AMSD | 275 |
| 21 (comp.) | Styrene/methacrylonitrile | No CTA | 250 |
| 22 (inv.) | Styrene/methacrylonitrile | 0.5% AMSD | 230 |
| 23 (inv.) | Styrene/methacrylonitrile | 1.0% AMSD | 225 |
| 24 (inv.) | Styrene/methacrylonitrile | 2.0% AMSD | 215 |

AMSD: alpha-methylstyrene dimer;
NIPA = N-isopropyl acrylamide

Results as illustrated in the Tables 6 and 7 are self-explaining in that a higher sensitivity is attained for materials wherein use has been made of ultrafine hydrophobic latex particles of polymers and copolymers, prepared according to the method of this invention.

10. Examples Illustrating Application in the Backing Layer of Graphic Silver Halide Film Materials (See Table 8)

As a particular advantage of making use of ultrafine polymer latex parameters prepared according to the method of the present invention improvement of "haze", resulting in a remarkably better clarity of the film material, has been proved in the Table 8 hereinafter.

TABLE 8

| Latex no. | Monomers used/CTA | NMP % | Haze 560 nm | Visual film clarity |
|---|---|---|---|---|
| 7 (comp.) | MMA/no CTA | 0 | 60.91 | Extremely Mat |
| 7 (comp.) | MMA/no CTA | 2.5 | 1.31 | Slightly mat |
| 7 (comp.) | MMA/no CTA | 5 | 0.49 | Slightly mat |
| 8 (inv.) | MMA/60 ppm Cobalt II diphenyl | 0 | 39.09 | Mat |
| 8 (inv.) | MMA/60 ppm Cobalt II diphenyl | 2.5 | 0.83 | Slightly mat |
| 8 (inv.) | MMA/60 ppm Cobalt II diphenyl | 5 | 0.4 | Clear |

Having described in detail preferred embodiments of the current invention, it will now be apparent to those skilled in the art that numerous modifications can be made therein without departing from the scope of the invention as defined in the appending claims.

The invention claimed is:

1. Method of preparing, by free radical emulsion polymerization, of
ultrafine hydrophobic latex polymer or copolymer particles in order to polymerize or copolymerize monomers or monomer mixtures respectively, of at least one purified compound as a chain transfer agent (CTA), wherein said latex particles have an average particle size of less than 90 nm, being at least 10% lower than if prepared in the absence of said CTA, wherein said polymerization is conducted in a water-based reaction in the presence of a chain transfer agent and of a surfactant, wherein said surfactant is present in a concentration versus said monomer or monomer mixture of from 5 up to 25% by weight for a non-ionic surfactant or from 0.05 up to 10% by weight for an ionic surfactant wherein said CTA is a water-soluble oligomer having surface-active graft copolymers with a hydrophilic graft and a hydrophobic main chain.

2. Method according to claim 1, wherein said surfactant is present in a concentration below twice its critical micelle concentration and wherein said CTA is a water-soluble oligomer having surface-active graft copolymers with a hydrophilic graft and a hydrophobic main chain.

3. Method according to claim 1, wherein said CTA is selected from the group consisting of alpha-methyl vinyl compounds or alpha-ethyl vinyl compounds and wherein said CTA is a water-soluble oligomer having surface-active graft copolymers with a hydrophilic graft and a hydrophobic main chain.

4. Method according to claim 1, wherein said CTA is selected from the group consisting of dimers or cross-dimers of -methylstyrene, methyl methacrylate, hydroxy ethylacrylate, benzyl methacrylate, allyl methacrylate, methacrylonitrile, glycidyl methacrylate, methacrylic acid, tert.-butyl methacrylate, isocyanatoethyl methacrylate, meta-isopropenyl-,-dimethyl isocyanate (TMI), omega-sulfoxyalkyl methacrylates and alkali salts thereof and wherein said CTA is a water-soluble oligomer having surface-active graft copolymers with a hydrophilic graft and a hydrophobic main chain.

5. Method according to claim 1, wherein said latex particles have an average particle size of less than 90 nm, being at least 20% lower than if prepared in the absence of said CTA.

6. Method according to claim 1, wherein said latex particles have an average particle size of from 10 to less than 90 nm.

* * * * *

UNITED STATES PATENT AND TRADEMARK OFFICE
CERTIFICATE OF CORRECTION

PATENT NO. : 7,022,762 B2  Page 1 of 1
APPLICATION NO. : 10/802706
DATED : April 4, 2006
INVENTOR(S) : Van Aert et al.

It is certified that error appears in the above-identified patent and that said Letters Patent is hereby corrected as shown below:

<u>Title page,</u>
Insert Item -- [30] Foreign Application Priority Data
        Dec. 20, 2000    (EP)    00000002.6 --.

Signed and Sealed this

Fourth Day of July, 2006

JON W. DUDAS
*Director of the United States Patent and Trademark Office*